United States Patent
Kiribayashi (10) Patent No.: US 7,055,639 B2
(45) Date of Patent: Jun. 6, 2006

(54) OCCUPANT DETECTION SYSTEM FOR VEHICLE

(75) Inventor: Shinichi Kiribayashi, Anjo (JP)

(73) Assignees: Denso Corporation, Kariya (JP); Fuji Jukogyo Kabushiki Kaisha, Tokyo (JP)

( * ) Notice: Subject to any disclaimer, the term of this patent is extended or adjusted under 35 U.S.C. 154(b) by 98 days.

(21) Appl. No.: 10/653,061

(22) Filed: Sep. 3, 2003

(65) Prior Publication Data

US 2004/0045759 A1     Mar. 11, 2004

(30) Foreign Application Priority Data

Sep. 6, 2002    (JP)   .............. 2002-261521

(51) Int. Cl.
     *B60D 1/28*      (2006.01)
(52) U.S. Cl. ................................... 180/271
(58) Field of Classification Search ............... 180/271, 180/273; 280/734, 735
See application file for complete search history.

(56) References Cited

U.S. PATENT DOCUMENTS 5,321,617 A * 6/1994 Mori et al. ............... 701/49
5,398,185 A    3/1995 Omura
5,446,661 A * 8/1995 Gioutsos et al. ............. 701/45
6,356,194 B1 * 3/2002 Fukui et al. ................ 340/561
6,520,535 B1 * 2/2003 Stanley et al. ............. 280/735

FOREIGN PATENT DOCUMENTS

| DE | 10239761 | 3/2001 |
| DE | 10152958 | 8/2003 |
| JP | A-2000-302003 | 10/2000 |
| WO | WO 99/138731 | 8/1999 |

* cited by examiner

*Primary Examiner*—Faye M. Fleming
(74) *Attorney, Agent, or Firm*—Posz Law Group, PLC (57) ABSTRACT

An occupant detection system determines a seat occupancy condition including occupancy of a vehicle seat and a size of the occupant, that is, an adult or a child. The determined seat occupancy condition is sent to an air bag ECU as seat occupancy condition data used for air bag deployment. The system detects a velocity of the vehicle and compares it with a predetermined velocity threshold. When the velocity is equal to or lower than the threshold, the seat occupancy condition is determined and the determined condition is stored in a storage area as seat occupancy condition data. When the velocity is over the threshold, the stored seat occupancy condition date is send to the air bag ECU.

10 Claims, 6 Drawing Sheets

OCCUPANCY CONDITION

CHILD ⟶ ADULT

OCCUPANCY CONDITION

ADULT ⟶ CHILD

OCCUPANT DETECTION SYSTEM FOR VEHICLE

CROSS REFERENCE TO RELATED APPLICATION

This application is based on and incorporates herein by reference Japanese Patent Application No. 2002-261521 filed on Sep. 6, 2002.

FIELD OF THE INVENTION

The present invention relates to an occupant detection system that determines a seat occupancy condition of a vehicle and sends the determined conditions to an occupant protection system.

BACKGROUND OF THE INVENTION

It has been proposed that a vehicle seat occupancy condition is determined for an appropriate operation of a vehicle occupant protection system, such as an air bag system. The seat occupancy condition includes presence or absence of an occupant in a vehicle seat, an adult or a child, and a physique of the occupant. To determine the seat occupancy condition, several different methods are proposed.

One method is determining the condition by detecting variations in load applied by the occupant using pressure sensors arranged in a seat. Other methods include determining the condition by measuring a hip size of the occupant and calculating a sum of applied pressures, and by measuring the weight of the occupant using strain sensors.

The condition can be accurately determined by the above methods if the occupant is properly seated. However, the condition may not be accurately determined if a part of the hip is lifted due to a wobble of the vehicle or an accelerated velocity as in a case that the vehicle turns at high speed. That is because the measured weight or hip size of the occupant varies in such a case. Therefore, the condition may not be accurately determined. When the inaccurately determined condition is sent to the air bag system, improper air bag deployment may be performed.

To solve the problem, it is proposed that a physique of the occupant is detected in a condition that the occupant is properly seated in a vehicle seat with a seatbelt fastened. The detected physique is stored as physique data. One of such kind is proposed in JP-A-2000-302003. The physique is always accurately detected because a measurement performed for the detection is not affected by the wobble or the accelerated velocity. Thus, appropriate physique data is always available for air bag deployment control.

In the above device, the physique data is stored only when the seatbelt is fastened. Therefore, the appropriate physique data is not stored if the occupant does not properly fasten the seatbelt.

SUMMARY OF THE INVENTION

The present invention therefore has an objective to provide an occupant detection system that provides accurate seat occupancy condition data. The seat occupancy condition data is created without influence of a wobble or an accelerated velocity of a vehicle, and stored in accordance with a driving condition.

An occupant detection system of the present invention includes a physique detection means and a seat occupancy condition determination means. The seat occupancy condition determination means determines a seat occupancy condition, that is, whether a vehicle seat is occupied and the seat is occupied by an adult or a child. The determination is made based on the occupant physique detected by the physique detection means. Then, the condition determination means sends the occupant physique data to an occupant protection system. The seat occupancy condition is stored in accordance with the driving condition of the vehicle.

When a part of the hip is lifted due to the wobble of the vehicle or the accelerated velocity as in a case that the vehicle turns at high speed, the physique is not accurately determined. As a result, the seat occupancy condition is not properly determined. In such a case, the seat occupancy condition previously stored is used, in other words, the stored condition is not altered. Therefore, the properly determined seat occupancy condition is always available.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

First Embodiment

Figure 1:
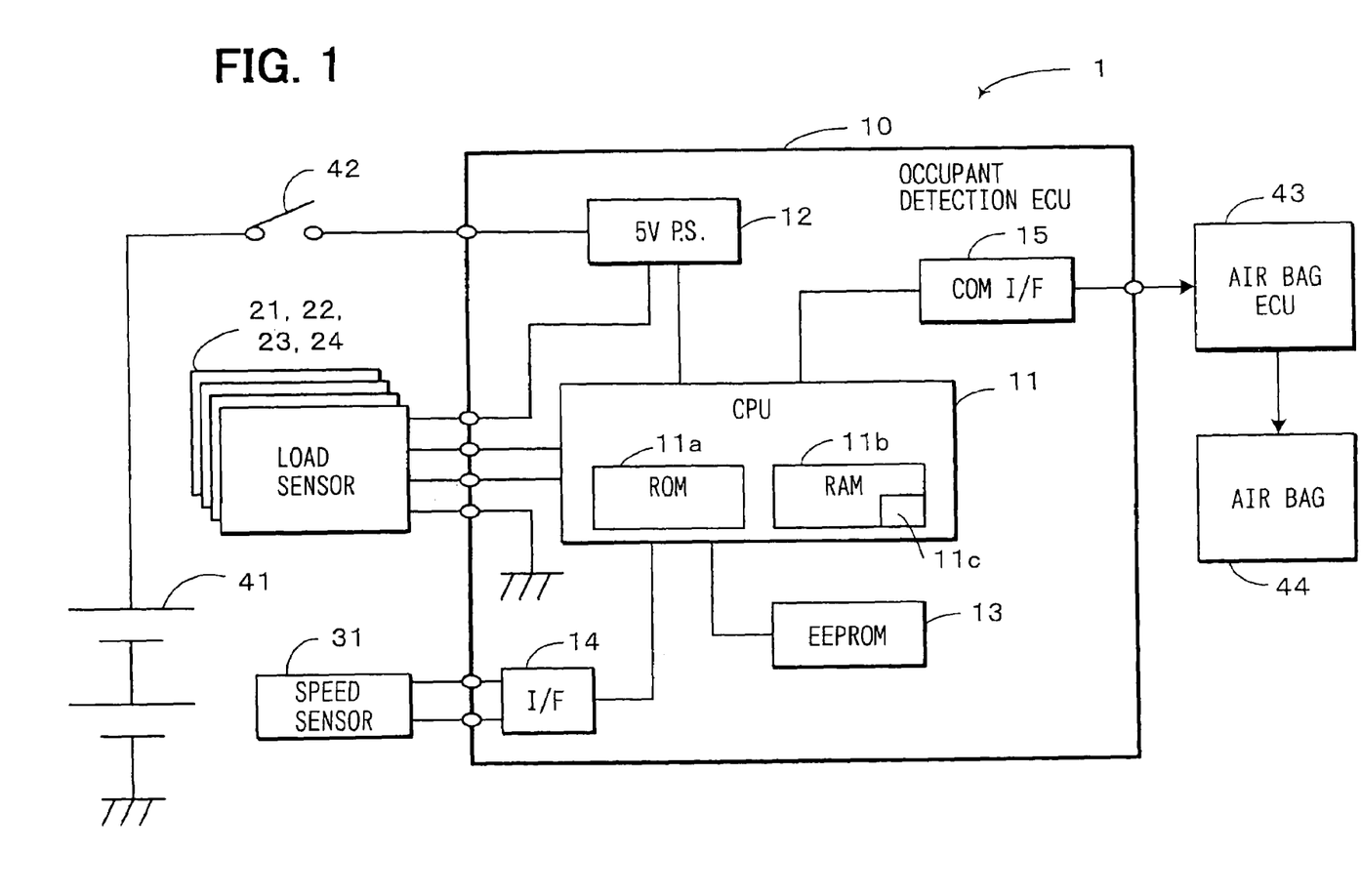
FIG. 1 is a block diagram of an occupant detection system according to the first embodiment of the present invention.

Referring to FIG. 1, an occupant detection system 1 includes an occupant detection electronic control unit (occupant detection ECU) 10, four strain gage-type load sensors 21, 22, 23, 24, and a speed sensor 31. A physique of a vehicle occupant is determined based on the occupant weight, which is calculated from loads detected by the strain gage-type load sensors (physique detection means) 21–24.

Figure 2:
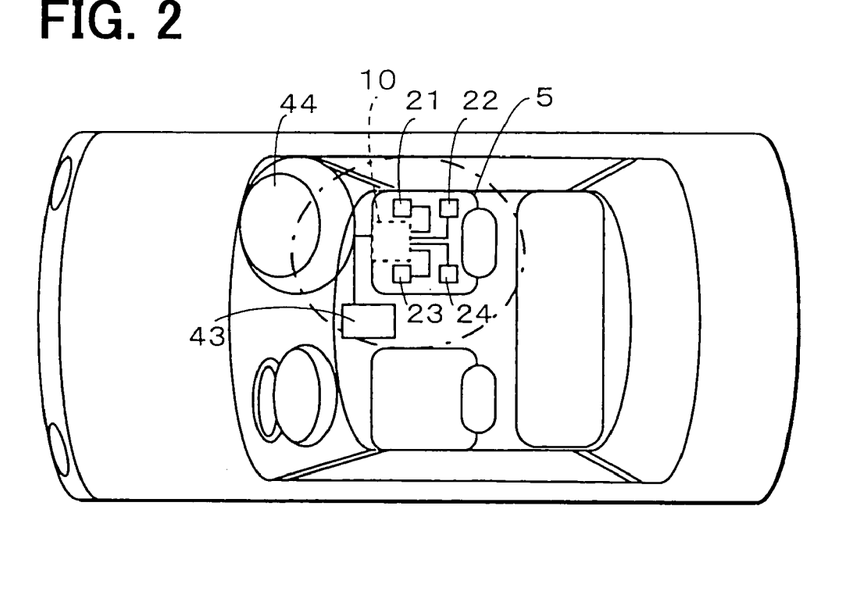
FIG. 2 is a top view of a vehicle showing an arrangement of the occupant detection system in the vehicle.
Figure 3:
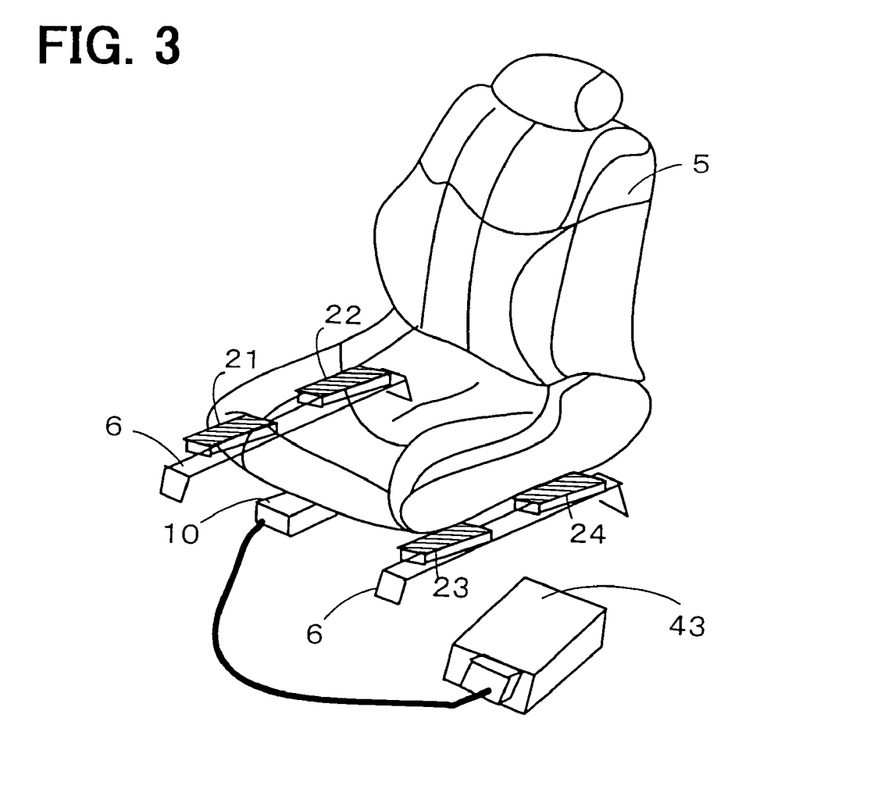
FIG. 3 is a perspective view of a vehicle seat and the occupant detection system.

The occupant detection ECU 10 includes a CPU 11, a 5V power source 12, an EEPROM 13, a speed sensor interface (IF) 14, and a communication interface (COM IF) 15. The occupant detection ECU 10 is located under a vehicle seat 5 as shown in FIGS. 2 and 3. The occupant detection ECU 10 can be installed under a passenger seat although FIGS. 2 and 3 only show the case of the driver's seat. The seat occupancy condition of the passenger seat changes more often than that of the driver's seat. Therefore, it is more effective to install the occupant detection system 1 for the passenger seat than the driver's seat.

The CPU 11 that includes a ROM 11a and a RAM 11b is connected to an ignition switch (IG-SW) 42 that is connected to an onboard battery 41. It executes an occupant detection program stored in the ROM 11a. The ROM 11a also stores a velocity threshold Vth, an empty seat threshold Eth, and an occupant weight threshold Wth. The CPU 11 is supplied with power from the power source 12 and turned on and off according to on-off signals from the IG-SW 42. A work area used by the CPU 11 and a seat occupancy condition storage area 11c are reserved in the RAM 11b.

The EEPROM 13 is an electrically rewritable nonvolatile memory used for storing error data when an error has occurred in the load sensors 21–24 and the speed sensor 31. The error data contains output values of the sensors 21–24, 31.

The IF 14 is an interface member that is connected to the speed sensor 31 via a communication line for receiving a speed signal from the speed sensor 31 and inputting it to the CPU 11. The COM IF 15 is an interface member that is connected to the air bag ECU 43 for inputting the seat occupancy condition determined by the CPU 11 to the air bag ECU 43 via a communication line.

The load sensors 21–24 are mounted on seat rails 6 at the right front, the right rear, the left front, and the left rear, respectively. They output analog voltage signals indicative of the loads applied to potions of the seat 5. Power is supplied to the load sensors 21–24 by the 5V power source 12.

The speed sensor 31 is a known speed sensor installed for detecting a vehicle speed and outputting a speed signal, and connected to the IF 14 via a communication line. The air bag ECU 43 is a control unit for controlling a deployment of an air bag 44, which is an occupant protection system. It is arranged in an interior of the vehicle and connected to the COM IF 15 via a communication line. The air bag ECU 43 performs various controls of the air bag 44, such as a start and a stop of the air bag deployment and air bag inflation control according to the size of the occupant. The controls are performed based on the seat occupancy conditions provided by the occupant detection ECU 10.

When the seat occupancy condition sent from the occupant detection ECU 10 is "empty," the air bag ECU 43 does not perform the air bag deployment even when a vehicle crash is detected. When the crash is detected and the seat occupancy condition is "the occupant is an adult," the air bag ECU 43 performs the air bag deployment at the maximum inflation level. When the crash is detected and the seat occupancy condition is "the occupant is a child," the air bag ECU 43 performs the air bag deployment at a reduced inflation level.

Figure 4:
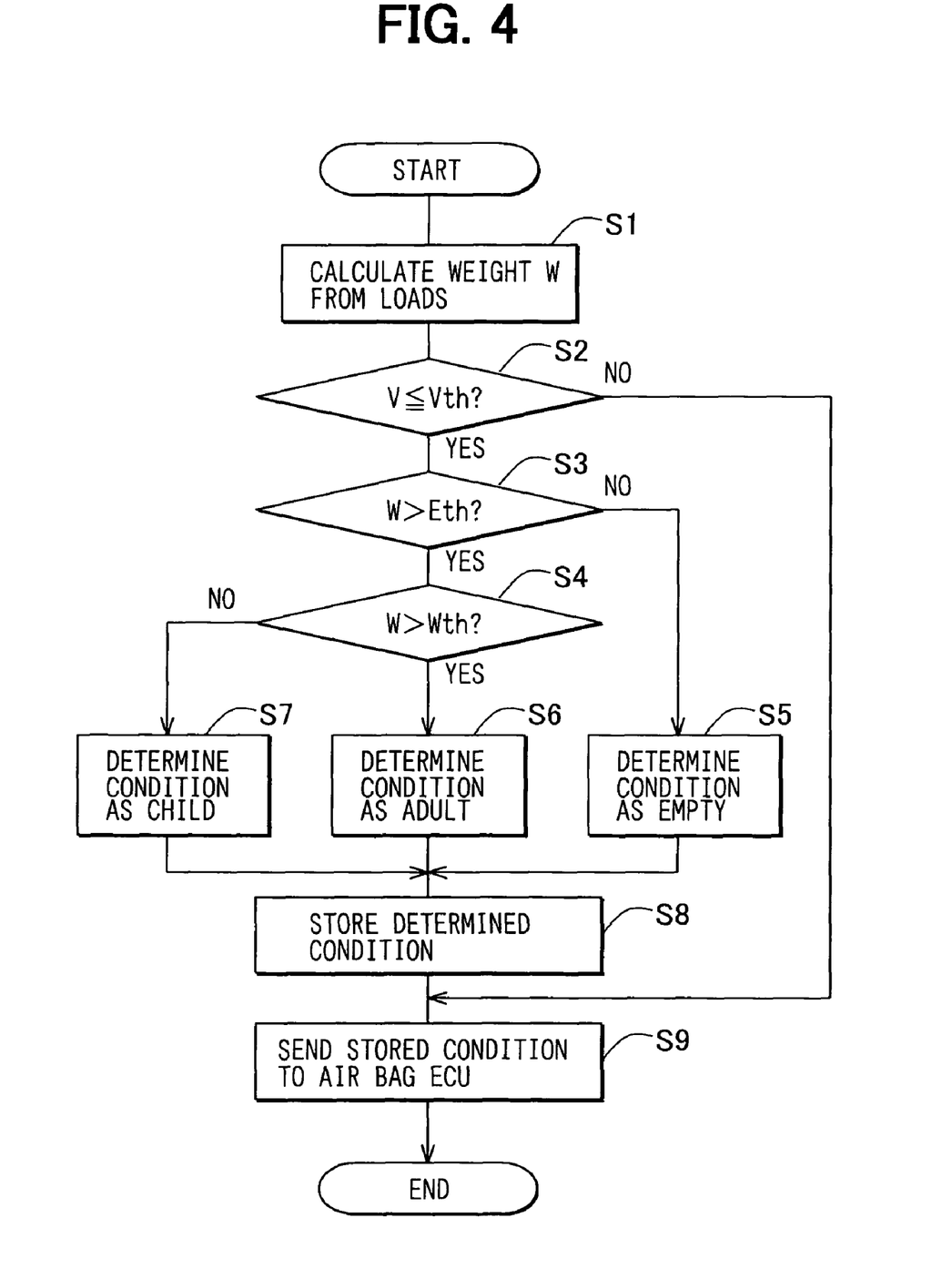
FIG. 4 is a flowchart of an occupant detection process according to the first embodiment.

The occupant detection process is performed following the steps shown in FIG. 4. The process is repeated at an interval of 500 µs to 1 ms by the CPU 11. Loads applied to the seat 5 are calculated by each area from the analog voltage signals outputted by the load sensors 21–24, and the loads are summed for calculating the weight W of the occupant (S1).

A velocity signal V is received from the speed sensor 31, and compared with the velocity threshold Vth (S2). The threshold Vth is the maximum velocity at which the occupant detection can be properly performed. In other words, the occupant detection cannot be properly performed if the velocity of the vehicle is higher than the threshold Vth. The threshold Vth is set at around 20 km/h.

When the velocity V is equal to or lower than the threshold Vth (the first driving condition), the weight W is compared with the empty threshold Eth (S3). The empty threshold Eth is set at around 10 kg. If the weight W is lower than the empty seat threshold Eth, the seat occupancy condition is determined as "empty" (S5). If the weight W is higher than the empty seat threshold Eth, the seat occupancy condition is determined as occupied, and the weight W is compared with the occupant detection threshold Wth (S4). The occupant threshold Wth is set at around 35 kg.

If the weight W is equal to or lower than the occupant detection threshold Wth, the seat occupancy condition is determined as "the occupant is a child" (S6). If the weight W is over the occupant threshold Wth, the seat occupancy condition is determined as "the occupant is an adult" (S7). One of the conditions determined at steps S5–S7 is stored in the seat occupancy condition storage area 11c (S8) of the RAM 11b as seat occupancy condition data. The seat occupancy condition data previously stored in the RAM 11b is overwritten with the currently determined seat occupancy condition data.

The newly stored seat occupancy condition data is sent by the COM IF 15 to the air bag ECU 43 via the communication line (S9) and the process is completed.

If the velocity V is over the velocity threshold Vth (the second driving condition), the occupant detection steps S3–S7 and the data storing step S8 is not performed. The previously stored data is sent to the air bag ECU 43 by the COM IF 15 via the communication line (S9), and the process is completed.

The data including the seat occupancy condition previously determined and stored in the storage area 11c is sent to the air bag ECU 43 without being overwritten. The data stored in the RAM 11b is not updated when the velocity is over the threshold Vth and proper determination cannot be made. As a result, improper deployment of the air bag is less likely to happen. Step S2 and steps S3–S7 correspond to the driving condition determination means and the seat occupancy condition determination means, respectively.

Figure 5A:
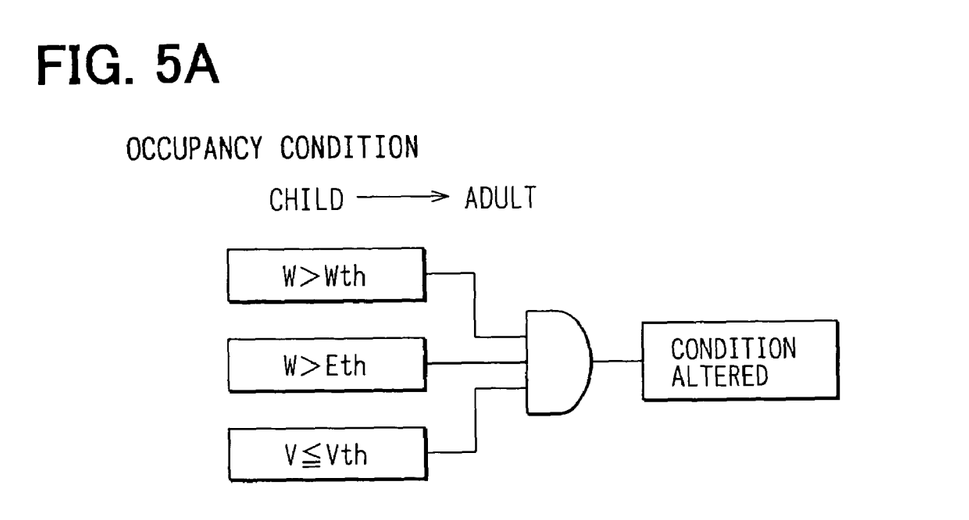
FIG. 5A is an explanatory diagram showing a seat occupancy condition that is altered from a child to an adult.
Figure 5B:
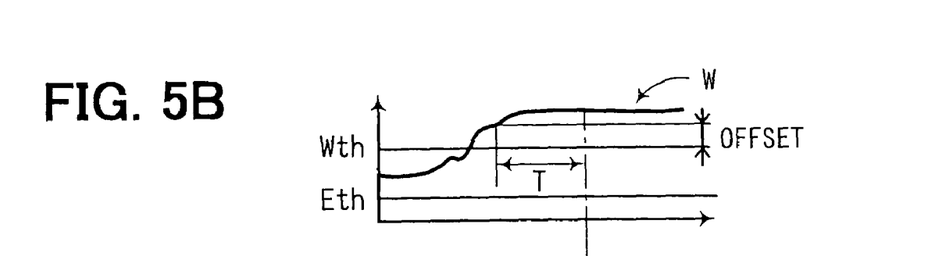
FIG. 5B is an explanatory graph showing changes in weight of the occupant.
Figure 5C:
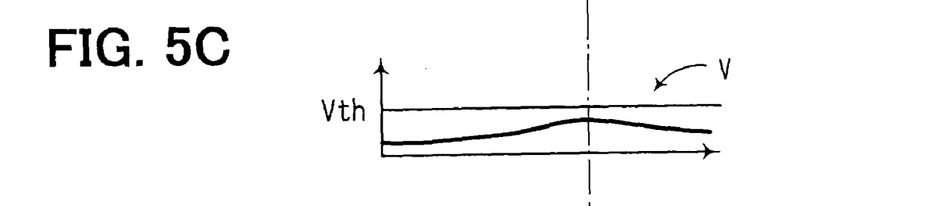
FIG. 5C is an explanatory graph showing changes in velocity of the vehicle.
Figure 5D:
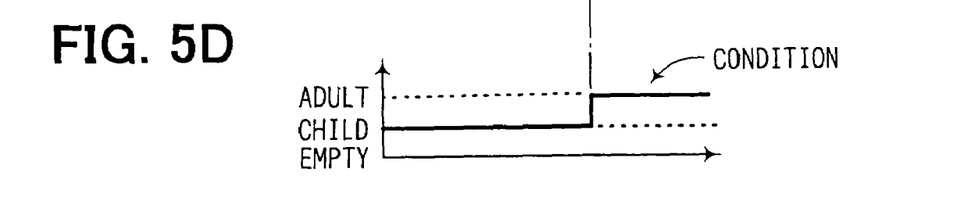
FIG. 5D is an explanatory graph showing changes in seat occupancy condition.
Figures 6A, 6B:
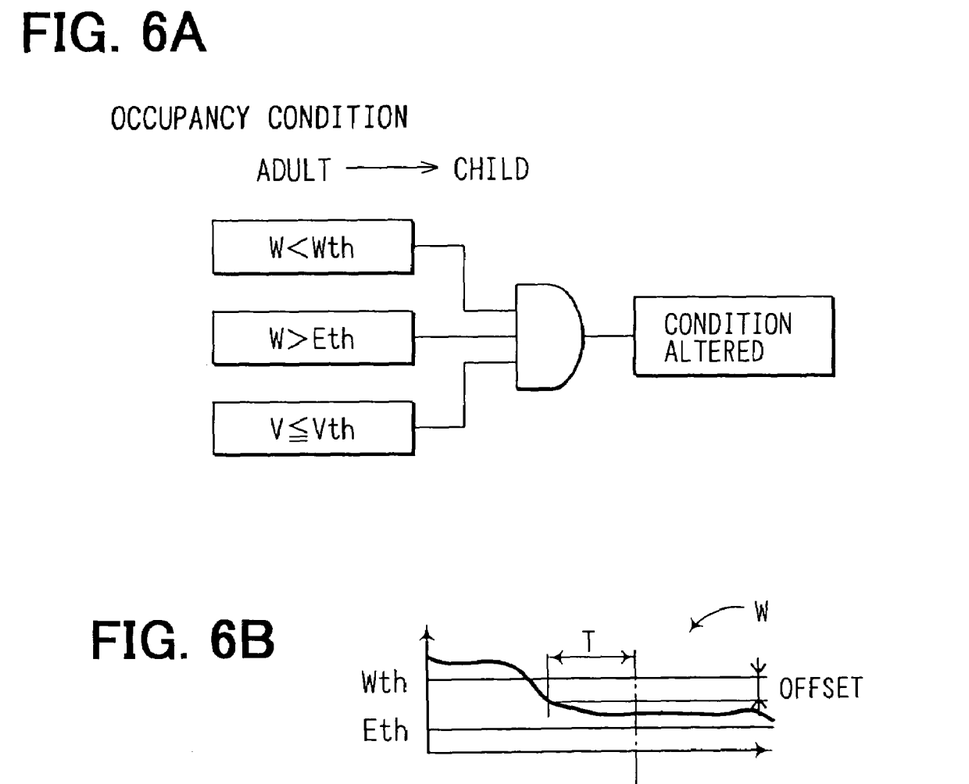
FIG. 6A is an explanatory diagram shown in a seat occupancy condition that is altered from a child to an adult.
FIG. 6B is an explanatory graph showing changes in weight of the occupant.
Figure 6C:
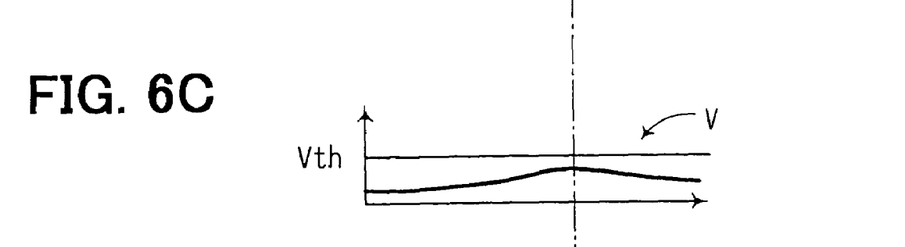
FIG. 6C is an explanatory graph showing changes in velocity of the vehicle.
Figure 6D:
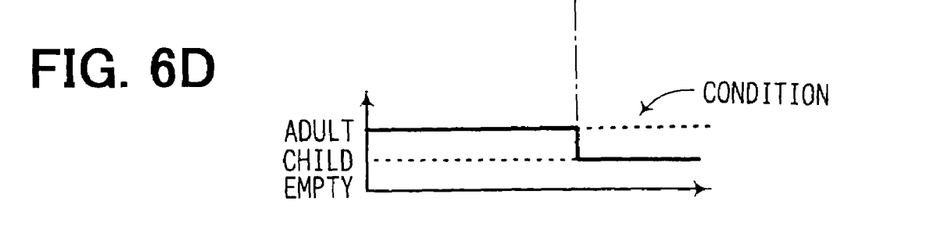
FIG. 6D is an explanatory graph showing changes in seat occupancy condition.

The seat occupancy condition determination steps will be explained in detail referring to FIGS. 5A, 5B, and 6. The weight W of the occupant is Eth<W≦Wth in the initial condition. Since the velocity V is equal to or lower than the threshold Vth, it is determined that the occupant is a child.

When an adult is seated instead of the child in the seat, the weight W becomes W>Wth. The velocity V is lower than the threshold Vth when time T has passed since the weight W has reached a value that is the threshold Wth plus a predetermined offset. Therefore, it is determined that the occupant is an adult. In other words, the seat occupancy condition is changed from a child to an adult, and this change is sent to the air bag ECU 43.

The weight W changes from W>Wth to Eth<W<Wth when a child is seated instead of the adult in the seat. The velocity V is lower than the threshold Vth when time T has passed since the weight W has reached a value that is the threshold Wth minus the offset. Therefore, it is determined that the occupant is a child. In other word, the seat occupancy condition is changed from an adult to a child, and that information is sent to the air bag ECU 43.

As described above, the loads applied to the seat 5 are measured by the load sensors 21–24, and the weight of the occupant is calculated based on the measured loads. Then, the seat occupancy condition is determined based on the weight, and the determined condition is sent to the air bag ECU 43 via the COM IF 15. The seat occupancy condition is stored according to the velocity of the vehicle. Under the condition that the occupant is not properly seated due to an accelerated velocity or a wobble of the vehicle, the previous seat occupancy condition is maintained. In other words, the previous seat occupancy condition is not overwritten. As a result, improper seat occupancy determination is reduced and reliable determination is performed.

When it is determined that the velocity signal from the speed sensor 31 is equal to or lower than the threshold Vth, the seat occupancy condition is determined at steps S3 to S7. The determined seat occupancy condition is stored in the storage area 11$c$ and sent to the air bag ECU 43 at step S9. Thus, the seat occupancy condition is properly determined based on the currently calculated weight under the condition that the velocity V is equal to or lower than the threshold Vth.

On the other hand, the previous seat occupancy condition stored in the storage area 11$c$ is maintained and sent to the air bag ECU 43 under the condition that the velocity V is over than the threshold Vth. The seat occupancy condition determination is not performed when the occupant is not properly seated in the seat It is determined whether the vehicle is traveling under the speed that the seat occupancy condition determination is properly performed. The vehicle speed is determined based on a signal from a speed sensor that is normally equipped in a vehicle. Therefore, no additional hardware for the determination is required.

Furthermore, the first driving condition and the second driving condition are properly determined by comparing the current velocity V with the threshold Vth stored in the ROM 11$a$. It is also properly determined whether the seat is occupied by comparing the empty seat threshold stored in the ROM 11$b$ with the weight calculated from the load sensed by the load sensors 21–24. If the seat is occupied, it is determined that the seat is occupied by a child or by an adult by comparing the weight with the occupant detection threshold Wth stored in the ROM 11$b$.

Second Embodiment

Figure 7:
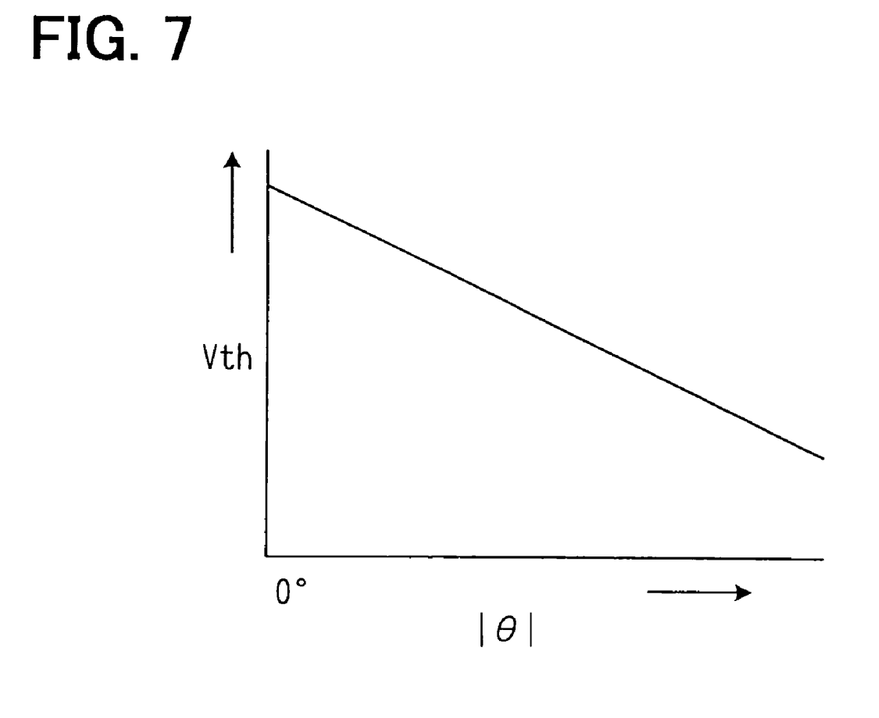
FIG. 7 is a graph showing a relationship between a velocity threshold and a steering angle of the vehicle according to the second embodiment of the present invention.

The driving condition is determined based on the speed signal and a signal indicative of a steering angle detected by a yaw rate sensor. The velocity threshold Vth is set so that it decreases as the steering angle θ decreases as shown in FIG. 7. The driving condition is determined based on two factors that affect the seat occupancy condition determination. The two factors are the vehicle speed and the steering angle. As a result, the driving condition is properly determined.

The bottom of the occupant tends to be lifted when the steering angle θ is large even the velocity is low. In such a case, the seat occupancy condition stored in the storage area 11$c$ is maintained. Therefore, the proper seat occupancy condition is always available.

Third Embodiment

Figure 8:
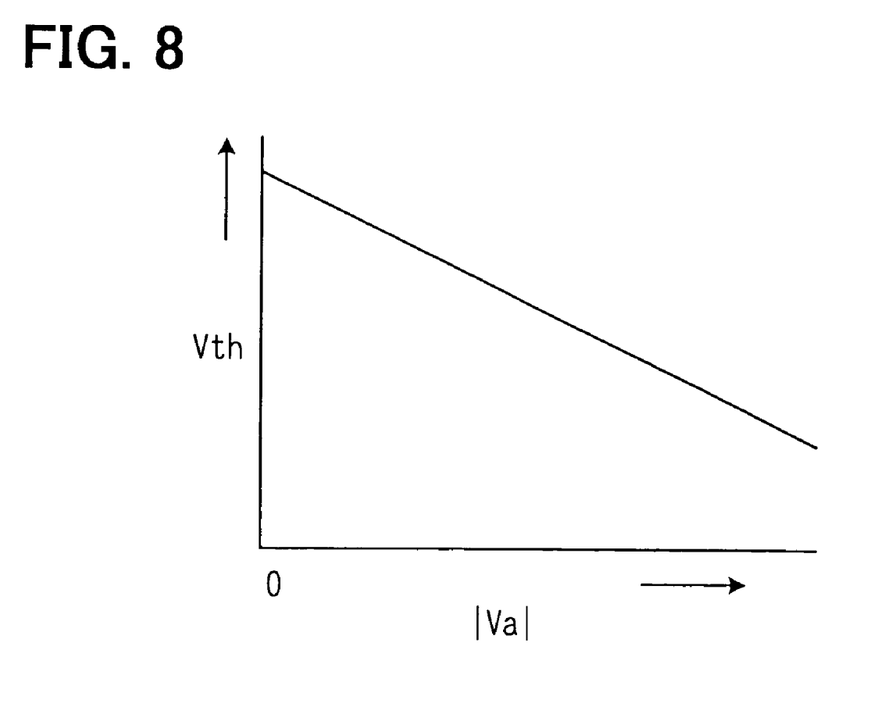
FIG. 8 is a graph showing a relationship between the velocity threshold and an accelerated velocity according to the third embodiment of the present invention.

The driving condition is determined based on an accelerated velocity Va detected by an omnidirectional sensor in addition to the velocity V and the steering angle θ used in the second embodiment. The velocity threshold Vth is set so that it decreases as the accelerated velocity Va increases as shown in FIG. 8. The driving condition is determined based on the accelerated velocity Va in a direction that affects the seat occupancy condition determination. Therefore, the driving condition is properly determined.

The hip of the occupant may be lifted due to the accelerated velocity Va even when the velocity is low. In such a case, the seat occupancy condition stored in the storage area 11$c$ is maintained. Therefore, the proper seat occupancy condition is always available.

The present invention should not be limited to the embodiment previously discussed and shown in the figures, but may be implemented in various ways without departing from the spirit of the invention. For example, the occupant detection system 1 may be used for other types of occupant protection systems including a seatbelt pretensioner device and a seatbelt retractor device. The seat occupancy condition may be determined by measuring the hip size of the occupant. The velocity sensor may be equipped to each wheel of the vehicle.

What is claimed is:

1. An occupant detection system for an occupant protection system in a vehicle, comprising:
   a physique detection means that detects physique of a vehicle occupant; and
   a seat occupancy condition determination means that determines a seat occupancy condition of the occupant based on occupant physique data indicative of the physique detected by the physique detection means, wherein
   the determined seat occupancy condition is sent to the occupant protection system, and
   the determined seat occupancy condition is stored in accordance with a driving condition of the vehicle,
   further including a driving condition determination means that determines one of a first driving condition and a second driving condition, wherein:
   the seat occupancy condition determination means determines the seat occupancy condition, stores the determined seat occupancy condition, and sends the determined seat occupancy condition to the occupant protection system when the driving condition is determined as the first driving condition; and
   the seat occupancy condition determination means maintains the seat occupancy condition determined under the first driving condition and sends the seat occupancy condition to the occupant protection system when the driving condition is determined as the second driving condition.

2. The occupant detection system according to claim 1, wherein the driving condition determination means determines the driving condition based on a velocity of the vehicle.

3. The occupant detection system according to claim 2, wherein:
   the driving condition determination means determines the first driving condition when the velocity of the vehicle is equal to or lower than a predetermined velocity threshold; and the driving condition determination means determines the second driving condition when the velocity of the vehicle is over the predetermined velocity threshold.

4. The occupant detection system according to claim 2, wherein the driving condition determination means determines the driving condition based on a steering angle of the vehicle in addition to the velocity of the vehicle.

5. The occupant detection system according to claim 2, wherein the driving condition determination means determines the driving condition based on an accelerated velocity in any of a plurality of directions of the vehicle in addition to the velocity of the vehicle.

6. The occupant detection system according to claim 1, wherein the seat occupancy condition determination means compares the physique data with at least one of predetermined thresholds;
the seat occupancy condition determination means determines whether an occupant is present in the seat based on the comparison; and
the seat occupancy condition determination means determines whether the occupant is an adult or a child based on the comparison if the occupant is present.

7. The occupant detection system according to claim 6, wherein:
the seat occupancy condition determination means determines that the seat is empty when the physique data is equal to or lower than a predetermined empty seat threshold;
the seat occupancy condition determination means determines that the seat is occupied by a child when the physique data is over the empty seat threshold and equal to or lower than an occupant detection threshold; and
the seat occupancy condition determination means determines that the seat is occupied by an adult when the physique data is over the occupant detection threshold.

8. The occupant detection system according to claim 1, wherein:
the driving condition determination means determines the first driving condition when the velocity of the vehicle is equal to or lower than a predetermined velocity threshold; and
the driving condition determination means determines the second driving condition when the velocity of the vehicle is over the predetermined velocity threshold.

9. The occupant detection system according to claim 1, wherein the driving condition determination means determines the driving condition based on a steering angle of the vehicle.

10. The occupant detection system according to claim 1, wherein the driving condition determination means determines the driving condition based on an accelerated velocity in any of a plurality of directions of the vehicle.

* * * * *

UNITED STATES PATENT AND TRADEMARK OFFICE
CERTIFICATE OF CORRECTION

PATENT NO. : 7,055,639 B2  Page 1 of 1
APPLICATION NO. : 10/653061
DATED : June 6, 2006
INVENTOR(S) : Shinichi Kiribayashi and Satoshi Goshima It is certified that error appears in the above-identified patent and that said Letters Patent is hereby corrected as shown below:

On Title Page, col. 1
Inventor(s)

Correct item (75) of the title page to read:

(75) Inventors: Shinichi Kiribayashi, Anjo-city (JP);
Satoshi Goshima, Tokyo (JP)

Signed and Sealed this

Fifth Day of September, 2006

JON W. DUDAS
*Director of the United States Patent and Trademark Office*